Feb. 21, 1950     A. Y. DODGE     2,498,399
TRANSVERSELY ENGAGING POSITIVE CLUTCH
Filed June 11, 1945
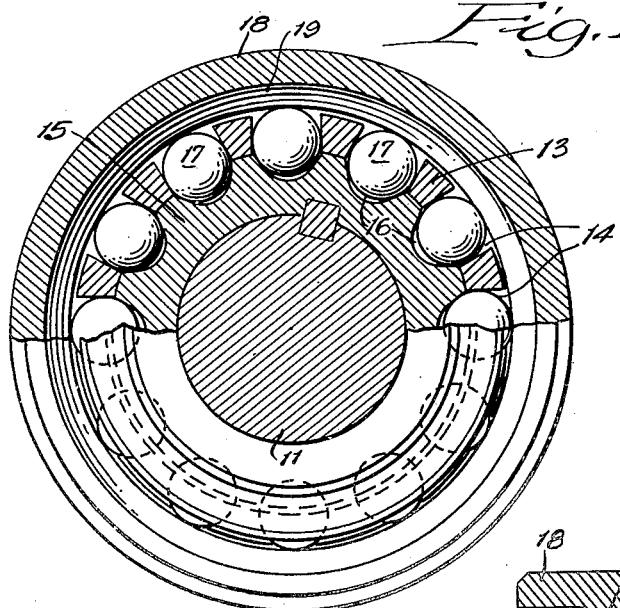
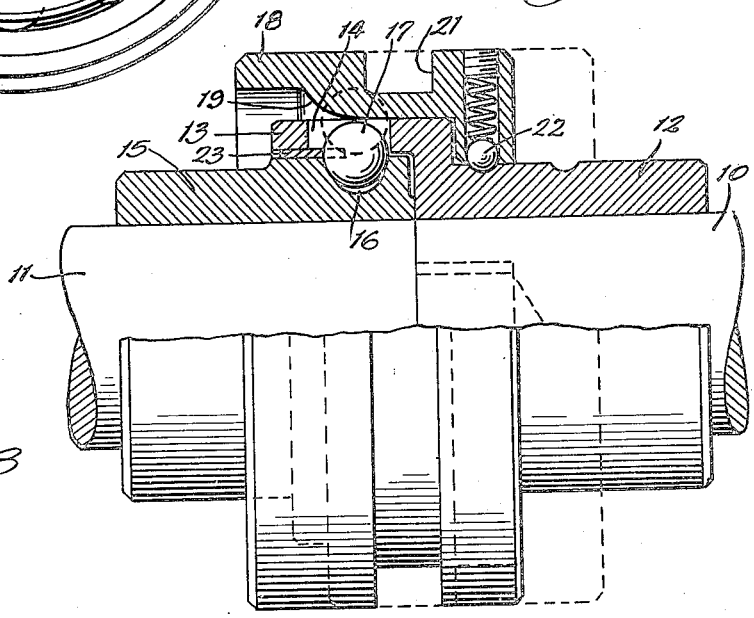
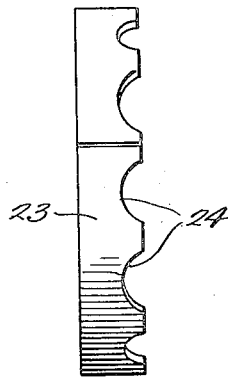
Inventor:
Adiel Y. Dodge,
By Dawson, Coms my Booth,
Attorneys.

Patented Feb. 21, 1950

2,498,399

UNITED STATES PATENT OFFICE 2,498,399

TRANSVERSELY ENGAGING POSITIVE CLUTCH

Adiel Y. Dodge, Rockford, Ill.

Application June 11, 1945, Serial No. 598,873

5 Claims. (Cl. 192—71)

This invention relates to clutches and more particularly to positive type mechanical clutches.

In machine tools, or the like, where positive mechanical clutches are employed, jaw type clutches have normally been used. Such clutches are difficult to engage under load except when the teeth are formed with a pick-up angle in which case the clutches do not engage well in both directions. Clutches of this type also require considerable force to disengage them under load.

It is one of the objects of the present invention to provide a positive mechanical clutch which can easily be engaged and disengaged under load, while running in either direction.

Another object is to provide a clutch which can be engaged under substantially full load and which transmits torque in either direction.

Still another object is to provide a clutch in which a greater mechanical advantage is provided to engage the clutch during its final than during its initial engagement.

A still further object is to provide a clutch which runs with minimum drag and noise when disengaged. According to one desirable construction, the clutch members are held disengaged by friction controlled means when the clutch is overrunning.

The above and other objects and advantages of the invention will be more readily apparent from the following description when read in connection with the accompanying drawings, in which—

Figure 1 is an end elevation with parts in section of a clutch embodying the invention;

Figure 2 is an axial section with parts in elevation; and

Figure 3 is a side elevation of the friction drag ring.

The clutch, as shown, is adapted to connect shafts 10 and 11. While either shaft may drive, preferably 10 is the driving shaft and 11 is the driven shaft which may be connected to a tool or other desired type of mechanism. The driving shaft 10 carries a driving member 12 which is keyed or splined thereto and which terminates at its outer end in a tubular sleeve portion 13 overhanging the end of the driven shaft 11. The sleeve portion 13 is formed with a series of circumferentially spaced substantially radial openings 14.

The driven shaft 11 has splined or keyed thereto a hub member 15, the outer end of which lies within the sleeve 13. The hub member 15 is formed in its periphery with a series of depressions 16 coinciding in number and spacing with the openings 14. Preferably, the depressions 16 are circular in plan and are rounded or generally conical so that their sides diverge as shown in Figures 1 and 2.

The sleeve 13 is adapted to be connected to the hub 15 by coupling members shown as balls 17 which slidably fit in the openings 14 and which are adapted partially to enter the depressions 16. The balls are adapted to be moved inwardly to clutch engaged position by a collar 18 slidably axially over the sleeve 13 and formed on its interior with a cam surface 19 which is convex in axial section, as shown. The collar 18 may be shifted by a shifting fork, or the like, engaging a groove 21 therein and may be yieldingly held in either its full engaged or full disengaged position by a spring detent 22.

The parts are shown in Figures 1 and 2 in the engaged clutch position with the collar 18 moved to the left so that the cam surface 19 moves the balls 17 radially inward into the depressions 16. In this position, the balls lie partially within the depressions 16 and partially within the openings 14 so that they drivingly connect the sleeve 13 to the hub 15. To disengage the clutch, the collar 18 is moved to the right permitting the balls 17 to move outwardly in the openings 14 to clear the hub 15 so that the hub is free to rotate relative to the sleeve. It will be noted that disengagement can be effected under full load with a minimum of effort since when the collar is moved to the right, the balls tend to move outwardly in the openings due to the camming action of the sides of the depressions thereon.

To reengage the clutch whether under load or not the collar 18 is again moved to the left so that the cam surface 19 will urge the balls inward toward the position shown. Due to the curvature of the cam surface, it will be seen that the force urging the balls inward in response to a given axial force on the collar is relatively small initially since a steep cam angle is provided at the outer end of the cam surface. As the collar moves further to the left the effective cam angle becomes flatter due to curvature of the cam surface 19 so that a greater mechanical advantage is provided between the collar and the balls. The balls are thus urged inwardly with a relatively high force in response to a relatively small axial force on the collar so that the clutch can be brought into complete engagement without requiring excessive effort.

When the clutch is being engaged under load, it will be seen that initial engagement occurs when the balls have moved inwardly far enough to engage the outer portions of the depressions. Since a substantial time interval will be consumed in travel of the center of the balls completely across the depressions even during relative rotation of the driving and driven shafts, the balls can be pressed into a position in which initial engagement will occur without requiring stopping or synchronizing of the driving and driven shafts. As soon as the driven shaft has been picked up by the balls continuing pressure on the collar acting through the increased mechanical advantage will force the balls into their full engaged position as shown in the drawing.

To minimize drag and to eliminate rattling of the balls during relative slow overrunning when the clutch is in disengaged position, means are provided to hold the balls radially outward so that they will not rattle against the depressions 16. This means, as shown, comprises a split ring 23 encircling the hub 15 and formed in one edge with a series of notches 24 in which the balls are partially received. The ring 23 is preferably made of such a size that it will frictionally engage the hub 15. For this purpose, the ring may, if desired, be formed slightly out of round. It will be noted that only a light friction is required.

When the clutch is disengaged and relative motion occurs between the driving and driven members, the ring will be turned with the driving member due to engagement of the balls in the notches 24 but will tend to drag on the driven member so that it acts against the sides of the balls to cam them outward. So long as overrunning occurs, the ring will hold the balls outward with a force dependent upon the frictional engagement of the ring with the hub so that the clutch overruns smoothly with a minimum of drag and rattling of the balls against the depressions is positively prevented. When the collar is moved to engage the clutch, the camming action of the balls on the sides of the notches 24 will easily turn the ring on the hub 15 so that the ring will not interfere with easy engagement of the clutch.

While one embodiment of the invention has been shown and described in detail it will be understood that this is illustrative only and is not intended as a definition of the scope of the invention, reference being had for this purpose to the appended claims.

What is claimed is:

1. A clutch for connecting driving and driven shafts comprising an annular sleeve connected to one of the shafts and formed with a plurality of substantially radial openings therethrough, a hub rotatable in the sleeve and formed in its periphery with a plurality of depressions adapted to register with the openings, balls movable in the openings, a cam collar slidable on the sleeve formed with an internal cam surface to engage the balls and cam them into the depressions, and a ring rotatably mounted between the sleeve and the hub having axially projecting parts to engage the balls and hold them yieldingly out of the depressions.

2. A clutch for connecting driving and driven shafts comprising an annular sleeve connected to one of the shafts and formed with a plurality of substantially radial openings therethrough, a hub rotatable in the sleeve and formed in its periphery with a plurality of depressions adapted to register with the openings, balls movable in the openings, a cam collar slidable on the sleeve formed with an internal cam surface to engage the balls and cam them into the depressions, and a ring rotatably mounted between the sleeve and the hub having axially projecting parts to engage the balls and hold them yieldingly out of the depressions, the ring being formed to engage the hub frictionally whereby it tends to turn with the hub.

3. A clutch comprising a tubular driving member formed with a series of substantially radial openings therethrough, a driven hub in the driving member formed in its periphery with a series of depressions adapted to register with the openings in the driving member, coupling members slidable in the openings having substantially rounded portions to engage the depressions, a cam collar slidable axially on the driving member to engage the coupling members and cam them into the depressions, and a ring rotatable on the hub formed with axial projections to engage the coupling members and hold them out of the depressions, the ring frictionally engaging the hub.

4. A clutch comprising a tubular driving member formed with a series of substantially radial openings therethrough, a driven hub in the driving member formed in its periphery with a series of depressions adapted to register with the openings in the driving member, balls slidable in the openings to engage the depressions, a cam collar slidable axially on the driving member and formed with an internal cam surface convex in axial section to engage the balls and cam them into the depressions, and a ring rotatable on and frictionally engaging the hub and formed with axially extending portions to engage the balls and hold them out of the depressions.

5. A clutch comprising a tubular driving member formed with a series of substantially radial openings therethrough, a driven hub in the driving member formed in its periphery with a series of depressions adapted to register with the openings in the driving member, coupling members slidable in the openings having substantially rounded portions to engage the depressions, a cam collar slidable axially on the driving member to engage the coupling members and cam them into the depressions, and a ring rotatably mounted between the driving member and the hub and formed with axial projections to engage the coupling members, the ring frictionally engaging the hub and being caused to turn with the driving member by engagement of the axial projections with the rounded portions of the coupling members when the coupling members are moved radially outward.

ADIEL Y. DODGE.

REFERENCES CITED

The following references are of record in the file of this patent:

UNITED STATES PATENTS

| Number | Name | Date |
|---|---|---|
| 1,126,924 | Valoppi | Feb. 2, 1915 |
| 2,101,366 | Frank | Dec. 7, 1937 |
| 2,194,787 | Dunn | Mar. 26, 1940 |
| 2,397,414 | Fast | Mar. 26, 1946 |

FOREIGN PATENTS

| Number | Country | Date |
|---|---|---|
| 95,776 | Sweden | Mar. 22, 1939 |
| 102,396 | Germany | Apr. 6, 1899 |
| 444,920 | France | Aug. 21, 1912 |
| 669,893 | France | Aug. 12, 1929 |